(12) United States Patent
Yamazaki

(10) Patent No.: US 7,292,279 B2
(45) Date of Patent: Nov. 6, 2007

(54) SOLID STATE IMAGE SENSING DEVICE AND PHOTOGRAPHING APPARATUS

(75) Inventor: Akihisa Yamazaki, Saitama (JP)

(73) Assignee: Fujifilm Corporation, Tokyo (JP)

( * ) Notice: Subject to any disclaimer, the term of this patent is extended or adjusted under 35 U.S.C. 154(b) by 702 days.

(21) Appl. No.: 10/854,577

(22) Filed: May 27, 2004

(65) Prior Publication Data

US 2004/0246369 A1 Dec. 9, 2004

(30) Foreign Application Priority Data

Jun. 4, 2003 (JP) ............................. 2003-159094

(51) Int. Cl.
*H04N 5/335* (2006.01)
(52) U.S. Cl. .................. 348/350; 348/315; 348/345
(58) Field of Classification Search ................ 348/315, 348/294, 340, 350
See application file for complete search history.

(56) References Cited

U.S. PATENT DOCUMENTS

| | | | |
|---|---|---|---|
| 6,195,154 B1 * | 2/2001 | Imai | 355/53 |
| 6,724,425 B1 * | 4/2004 | Moon et al. | 348/272 |
| 6,784,469 B1 * | 8/2004 | Yamane et al. | 257/222 |
| 6,787,824 B2 * | 9/2004 | Takeuchi et al. | 257/258 |
| 6,831,692 B1 * | 12/2004 | Oda | 348/315 |
| 7,071,984 B2 * | 7/2006 | Kawakami | 348/315 |
| 7,218,349 B2 * | 5/2007 | Kimura | 348/301 |
| 7,221,400 B2 * | 5/2007 | Takahashi et al. | 348/350 |
| 2003/0222262 A1 * | 12/2003 | Oda et al. | 257/72 |

FOREIGN PATENT DOCUMENTS

| | | |
|---|---|---|
| JP | 11-352393 | 12/1999 |
| JP | 2001-281534 | 10/2001 |

* cited by examiner

*Primary Examiner*—David Ometz
*Assistant Examiner*—Pritham Prabhakher
(74) *Attorney, Agent, or Firm*—McGinn IP Law Group, PLLC

(57) ABSTRACT

The present invention provides a solid state image sensing device capable of performing high-speed focal point adjustment without using a special optical system and a photographing apparatus including the device. Multiple photoelectric conversion elements are arranged and photoelectric conversion elements for auto focus (AF) are arranged between them. Concave and convex forms are formed, and the photoelectric conversion elements for rear side and front side AF are disposed in the concave and convex portions. The moving direction of a focusing lens is determined based on the difference between outputs of the photoelectric conversion elements for rear side and front side AF and the focusing lens is moved to the position where the contrast value obtained from the photoelectric conversion elements becomes the maximum.

15 Claims, 11 Drawing Sheets

SOLID STATE IMAGE SENSING DEVICE AND PHOTOGRAPHING APPARATUS

CROSS-REFERENCE TO RELATED APPLICATION

This application claims priority under 35 U.S.C. 119 from Japanese Patent Application No. 2003-159094, the disclosure of which is incorporated by reference herein.

BACKGROUND OF THE INVENTION

1. Field of the Invention

The present invention relates to a solid state image sensing device and a photographing apparatus, and particularly, to a solid state image sensing device that can be applied to an auto focus camera for automatically performing focal point adjustment, and a photographing apparatus including the device.

2. Description of the Related Art

Recently, digital cameras including imaging devices such as a charge-coupled device (CCD) have become the photographing apparatuses of choice for many people. When photographing with CCD-equipped digital cameras, an object image is formed on the photo reception surface of the CCD, and the image is converted into an amount of signal charge in accordance with the quantity of light entering in the respective photo reception elements of the CCD. Then, the signal charge stored in the CCD is read out with respect for each pixel and converted into image data, and this image data is recorded in a recording medium such as a memory card.

In such digital cameras, just as in silver salt cameras, there have been proposals to include an auto focus function (hereinafter, referred to as AF) for automatically performing focal point adjustment of the object to be photographed. The AF function has a focusing lens for focal point adjustment and forms the object image on the CCD or the like, and focal point adjustment is performed by moving the focusing lens.

Most AF systems found in digital cameras are usually the so-called contrast AF system, which controls the focusing lens to move to the position where the contrast of the picture signal from the imaging device is the greatest.

Further, a system referred to as Through The Lens (TTL) phase contrast AF is used for single lens reflex cameras and the like. The TTL phase contrast AF system is a system for determining the focusing position by splitting a light beam and calculating the defocus amount (out-of-focus amount) from the phase contrast of the beam and controlling the movement of the focusing lens. In this system, since the defocus amount is known, focusing can be performed at high speed by making the out-of-focus amount zero.

Further, other AF methods have been proposed, such as a method for focusing by using multiple imaging devices like the technology disclosed in Japanese Patent Application Laid-Open (JP-A) No. 11-352393 (p. 1, FIG. 2), and a method for providing one of the multiple image sensing devices so as to be inclined relative to the optical axis, like the technology disclosed in JP-A No. 2001-281534 (p. 1, FIG. 1).

Nonetheless, in general contrast AF systems, since it is necessary to move the focusing lens over the entire moving range to detect contrast and find the position of the focusing lens where the contrast becomes the greatest, there is a problem in that it takes a longer time to focus. Further, in the TTL phase contrast AF system, there are problems in that the object image must be split for imaging and for focusing, and an optical system for exclusive use is required in order to obtain the phase contrast of light split for focusing.

There are also problems in the AF systems disclosed in JP-A Nos. 11-352393 and 2001-281534. Multiple imaging devices are required in both systems, and, in the AF system disclosed in JP-A No. 11-352393, an optical system such as a prism for splitting light is required, making the structure complex.

SUMMARY OF THE INVENTION

The present invention is achieved in order to solve the above described problems and an object of the invention is to provide a solid state image sensing device capable of performing focal point adjustment at high speed without using a special optical system and a photographing apparatus including the device.

In order to achieve the object, a first aspect of the invention includes plural photoelectric conversion elements for photographing an object; concave portions provided on a surface on which the photoelectric conversion elements for photographing are arranged; convex portions provided on the surface on which the photoelectric conversion elements for photographing are arranged; and auxiliary photoelectric conversion elements provided in the concave portions and the convex portions.

According to the first aspect of the invention, the concave and convex portions are provided on the surface on which the plural photoelectric conversion elements for photographing an object are arranged, and the auxiliary photoelectric conversion elements are provided in the concave and convex portions.

In the case of focal point adjustment of a lens for forming an image on such solid state image sensing device, the distance to the lens becomes shorter in the order of the auxiliary photoelectric conversion elements in the convex portions, the photoelectric conversion elements for photographing, and the auxiliary photoelectric conversion elements in the concave portions. Accordingly, focusing direction of the lens relative to the photoelectric conversion elements for photographing can be detected by taking the difference between the auxiliary photoelectric conversion elements in the convex portions and the auxiliary photoelectric conversion elements in the concave portions, and focal point adjustment can be performed at high speed.

For example, the concave portions and convex portions can be formed between the photoelectric conversion elements for photographing to arrange the auxiliary photoelectric conversion elements in the concave and convex portions. The concave portions and convex portions may be formed in a staggered manner, formed so as to alternate the concave portions and convex portions in every several rows, or formed so as to align the concave portions and convex portions adjacently in diagonal directions, respectively.

Note that the auxiliary photoelectric conversion elements can be made to be hardly affected by color by providing color filters to the photoelectric conversion elements for photographing other than the auxiliary photoelectric conversion elements, and the object brightness contrast can be accurately obtained.

Further, in the case where the infrared filters are provided, by providing the filters to the photoelectric conversion elements for photographing other than the auxiliary photoelectric conversion elements, the sensitivity deterioration of the auxiliary photoelectric conversion elements can be suppressed, and the focusing direction can be ensured to be detected.

Furthermore, the surface on which the photoelectric conversion elements for photographing and the auxiliary photoelectric conversion elements are arranged may have a curved surface form. For example, by making it into a curved surface form according to the curvature R of the lens for forming an image on the solid state image sensing device, light can be ensured to enter the auxiliary photoelectric conversion elements in the concave portions located in the vicinity of the outer periphery of the solid state image sensing device.

A second aspect of the invention includes the solid state image sensing device of the first aspect; an optical system for forming an object image on the solid state image sensing device; a moving component for moving the optical system for focal point adjustment; a focusing direction control component for determining a focusing direction based on the difference between outputs of the auxiliary photoelectric conversion elements provided in the concave portions and outputs of the auxiliary photoelectric conversion elements provided in the convex portions, and controlling the moving component to move the optical system in the determined focusing direction; and a control component for setting the maximum value of the contrast value in outputs of the photoelectric conversion elements for photographing as a focusing position, and controlling the moving component to move the optical system to the focusing position.

According to the second aspect of the invention, the object image is formed on the above described solid state image sensing device by the optical system.

The optical system is moved by the moving component, and thereby, focus point adjustment on the photoelectric conversion elements for photographing of the solid state image sensing device can be performed.

Here, as described above, since the distance to the lens becomes shorter in the order of the auxiliary photoelectric conversion elements in the convex portions, the photoelectric conversion elements for photographing, and the auxiliary photoelectric conversion elements in the concave portions, the focusing direction of the lens relative to the photoelectric conversion elements for photographing can be detected by taking the difference between the auxiliary photoelectric conversion elements in the convex portions and the auxiliary photoelectric conversion elements in the concave portions, and thereby, the focusing direction is determined based on the difference between the outputs of the auxiliary photoelectric conversion elements provided in the concave portions and the outputs of the auxiliary photoelectric conversion elements provided in the convex portions by the focusing direction control component and the moving component is controlled to move the optical system in the determined focusing direction.

Further, in the control component, the maximum value of the contrast value in the outputs of the photoelectric conversion elements for photographing is set as the focusing position, and the moving component is controlled to move the optical system to the focusing position.

Thus, by controlling the focal point adjustment, the focal point adjustment can be performed with accuracy at high speed without using a specialized optical system.

By the way, a light amount control component and a switching component may be further included. For example, since it is conceivable, in the case where the auxiliary photoelectric conversion elements are smaller than the photoelectric conversion elements for photographing, that the light amount entered into the solid state image sensing device becomes smaller and the output difference between the auxiliary photoelectric conversion elements provided in the concave portions and the convex portions becomes unreliable, whether or not focusing direction determination by the focusing direction control component is performed may be switched by the switching component in accordance with the control of the light amount control component. If the focusing direction determination by the focusing direction control component is not performed, the focal point adjustment can be performed by detecting the maximum value of the contrast value in the outputs of the photoelectric conversion elements for photographing.

Further, a detection component and a switching component may be further included. For example, since it is conceivable, in the case where the object image is dark when the auxiliary photoelectric conversion elements are smaller than the photoelectric conversion elements for photographing, that the output difference between the auxiliary photoelectric conversion elements provided in the concave portions and the convex portions similarly becomes unreliable, whether or not focusing direction determination by the focusing direction control component is performed may be switched by the switching component in accordance with the brightness detected by the detection component. If the focusing direction determination by the focusing direction control component is not performed, the focal point adjustment can be performed by detecting the maximum value of the contrast value in the outputs of the photoelectric conversion elements for photographing.

Furthermore, a storage component and a correction component may be further included. That is, by storing in advance the sensitivity ratio between the auxiliary photoelectric conversion elements provided respectively in the concave portions and the convex portions and correcting the output values of the auxiliary photoelectric conversion elements based on the stored sensitivity ratio, the focal point adjustment can be performed with accuracy.

A third aspect of the present invention is to provide a focusing method using a photographing apparatus comprising: providing a solid state image sensing device that includes at least plural photoelectric conversion elements for photographing that photographs an object; concave portions provided on a surface on which the photoelectric conversion elements for photographing are arranged; convex portions provided on the surface on which the photoelectric conversion elements for photographing are arranged; and auxiliary photoelectric conversion elements provided in the concave portions and the convex portions.

As described above, according to the invention, since, by providing concave and convex portions on the surface on which the plural photoelectric conversion elements for photographing are arranged, and the auxiliary photoelectric conversion elements in the concave and convex portions, the focusing direction of the optical system for forming an image on the solid state image sensing device can be determined based on the output difference between the auxiliary photoelectric conversion elements, there is an advantage that the focal point adjustment can be performed at high speed without using a special optical system.

DETAILED DESCRIPTION OF THE INVENTION

Hereinafter, an example of the embodiment of the present invention will be described in detail.

First, a solid state image sensing device 50 according to the embodiment of the invention will be described by referring to FIGS. 1A and 1B.

Figure 1A:
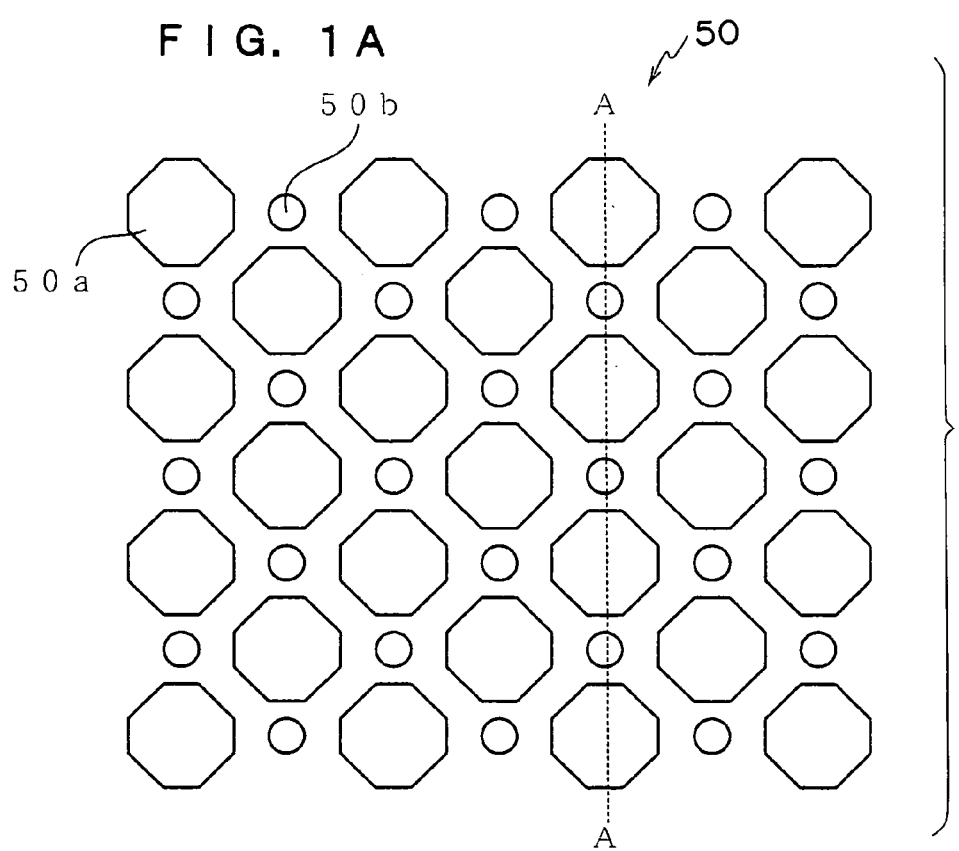
FIG. 1A is a front view showing a solid state image sensing device according to the embodiment of the present invention.

As shown in FIG. 1A, the solid state image sensing device 50 according to the embodiment of the invention has multiple photoelectric conversion elements 50a for photographing arranged therein, and photoelectric conversion elements 50b for AF as auxiliary photoelectric conversion elements of the invention arranged between them. The photoelectric conversion element 50b for AF is smaller than the photoelectric conversion element 50a for photographing. Note that, in FIGS. 1A and 1B, the solid state image sensing device 50 according to the embodiment of the invention is shown as a honeycomb structure, however, the invention is not limited thereto.

Figure 1B:
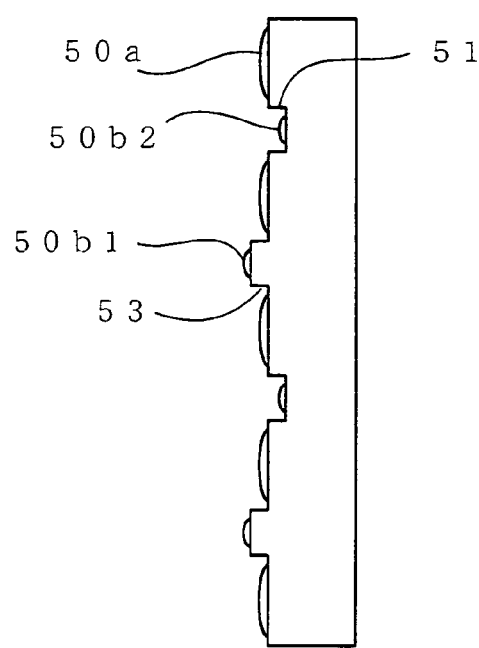
FIG. 1B is a cross sectional view showing the A-A cross section of FIG. 1A.

Further, as shown in FIG. 1B, the solid state image sensing device 50 of the invention has concave and convex forms on the surface thereof on which the respective photoelectric conversion elements 50a and 50b are arranged, and photoelectric conversion elements 50b for AF are formed in concave portions 51 and convex portions 53 of the concave and convex forms, respectively. Hereinafter, the photoelectric conversion element 50b in the concave portion 51 is referred to as a photoelectric conversion element 50b2 for rear side AF and the photoelectric conversion element 50b in the convex portion 53 is referred to as a photoelectric conversion element 50b1 for front side AF.

Note that the distance between the photoelectric conversion element 50a for photographing and the photoelectric conversion element 50b2 for rear side AF and the distance between the photoelectric conversion element 50a for photographing and the photoelectric conversion element 50b1 for front side AF are made substantially equal.

Figure 2A:
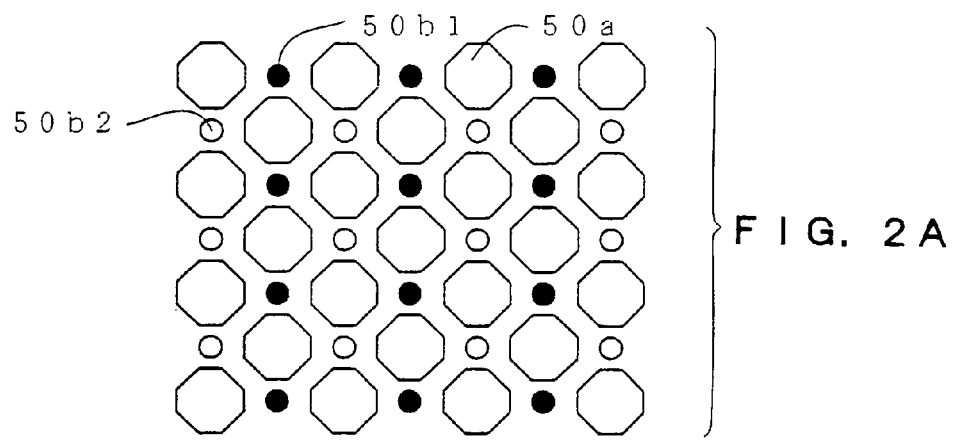
FIGS. 2A to 2C are diagrams showing examples of arrangement of the photoelectric conversion elements for AF in the concave portions and the convex portions in the solid state image sensing device according to the embodiment of the present invention.
Figure 2B:
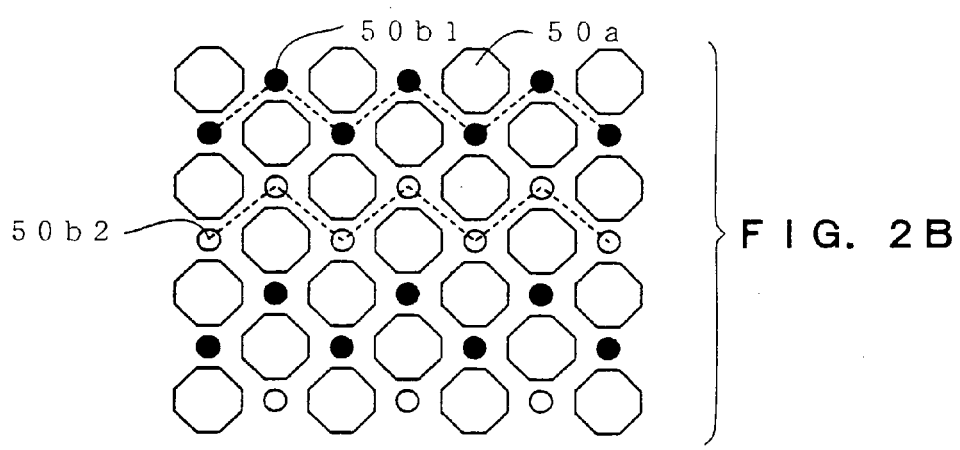
Figure 2C:
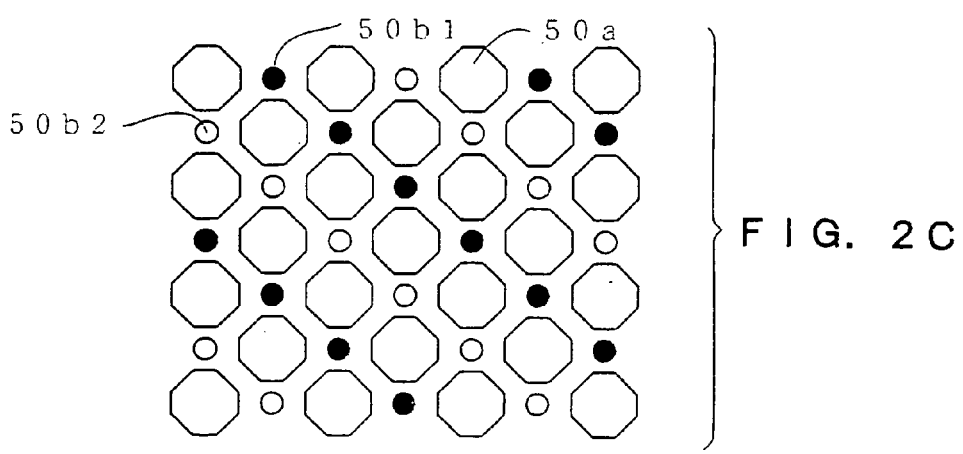

In the solid state image sensing device 50 according to the embodiment, the concave portions 51 and the convex portions 53 are formed so that the photoelectric conversion elements 50b2 for rear side AF and the photoelectric conversion elements 50b1 for front side AF may be alternately arranged in a staggered manner. In FIGS. 2A to 2C, the photoelectric conversion elements 50b1 for front side AF are shown by black circles, and the photoelectric conversion elements 50b2 for rear side AF are shown by white circles.

Figure 3A:
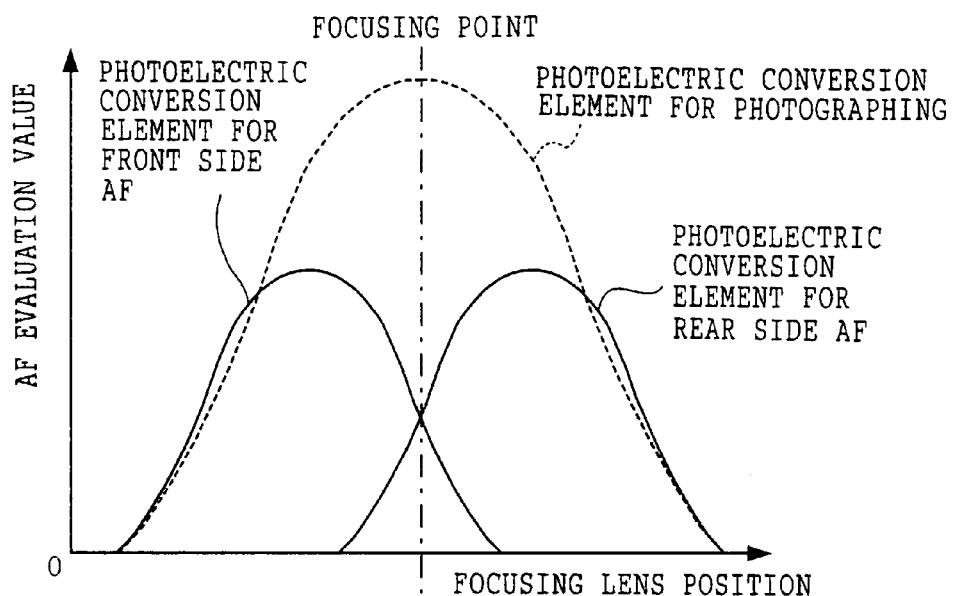
FIG. 3A is a graph showing AF evaluation values of the photoelectric conversion elements for photographing and the photoelectric conversion elements for AF in response to the focus lens position.
Figure 3B:
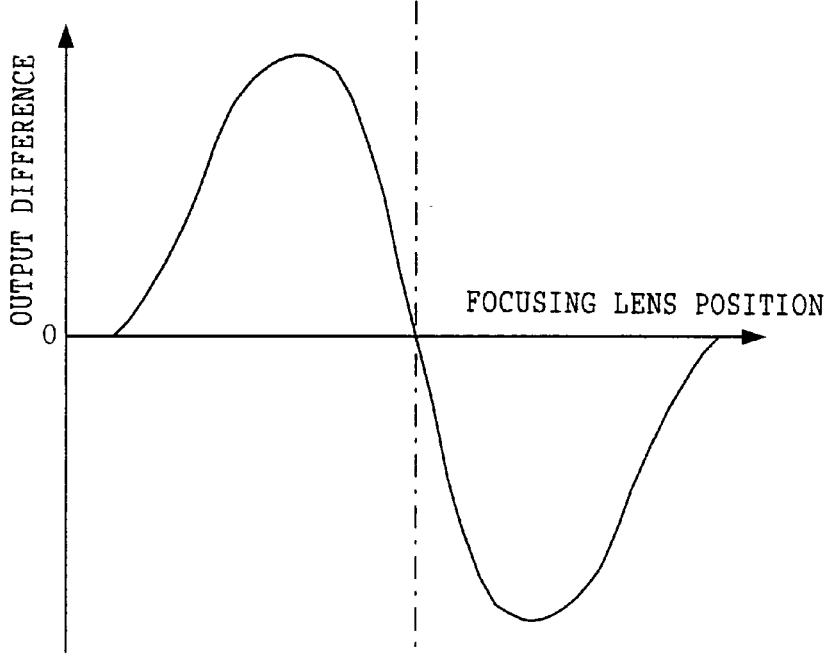
FIG. 3B is a graph showing the output difference between the photoelectric conversion elements for front side AF and the photoelectric conversion elements for rear side AF.

FIG. 3A shows evaluation values of the photoelectric conversion elements 50b2 for rear side AF and the photoelectric conversion elements 50b1 for front side AF in response to the position of the focusing lens. Further, FIG. 3B is a graph showing the difference between the evaluation values of the photoelectric conversion elements 50b1 for front side AF and the photoelectric conversion elements 50b2 for rear side AF.

After a charge is read out from the photoelectric conversion elements 50b1 and 50b2 from AF, digital signal processing is performed thereon, and the contrast of the photoelectric conversion elements 50b1 for front side AF and the contrast of the photoelectric conversion elements 50b2 for rear side AF are calculated. As shown in FIG. 3A, the AF evaluation value changes in response to the focusing lens position.

Since each of the photoelectric conversion elements 50b1 and 50b2 for AF are at distances from the focusing lens that differ only by their respective concave and convex forms, the focusing lens positions to the peak values of the respective AF evaluation values become different positions, as shown in FIG. 3A. One of them shifts forward relative to the focusing point of the photoelectric conversion element 50a, and the other shifts rearward. That is, the distance to the focusing lens is shorter in the order of the photoelectric conversion element 50b1 for AF, the photoelectric conversion element 50a, and the photoelectric conversion element 50b2 for AF, and the focusing point of the photoelectric conversion element 50a can be judged to be in which direction from the difference between the photoelectric conversion elements 50b1 and 50b2 for AF as shown in FIG. 3B. Therefore, the focusing direction can be judged based on the AF evaluation values of the photoelectric conversion elements 50b1 and 50b2 for AF. In the case where the difference between the photoelectric conversion element 50b1 for front side AF and the photoelectric conversion element 50b2 for rear side AF is large, since they are disposed substantially at equal distances to the photoelectric conversion element 50a, respectively, the point where the difference between them becomes zero can be set as the focusing point.

Further, in the photoelectric conversion elements 50b1 and 50b2 for AF, color filters are not provided in order to make them less susceptible to color. Alternatively, by providing a white filter, the contrast can be obtained accurately without being affected by a color filter.

Furthermore, regarding infrared cut (IR) filters that are commonly used, when these are formed by deposition, the deposition is performed only in the part of the photoelectric conversion element 50a, and photoelectric conversion elements 50b1 and 50b2 for AF are not coated, as with color filters. Accordingly, sensitivity to low brightness can also be improved.

Note that the arrangement of the photoelectric conversion elements 50b2 for rear side AF and the photoelectric conversion elements 50b1 for front side AF is not limited to the arrangement described above. For example, as shown in FIG. 2B, the concave and convex forms may be formed so as to arrange the photoelectric conversion elements 50b2 for rear side AF in the concave portions 51 and the photoelectric conversion elements 50b1 for front side AF in the convex portions 53 alternately in every two rows. In this case, as shown by the dotted lines in FIG. 2B, the photoelectric conversion elements 50b2 for rear side AF and the photoelectric conversion elements 50b1 for front side AF can be read out independently by reading out the charge of the photoelectric conversion elements 50b1 and 50b2 for AF in a zigzag manner. For this reason, by providing integrating resistors for the concave portions 51, integrating resistors for the convex portions 53, and simply performing differential processing on the data obtained by reading out from each of the photoelectric conversion elements 50b1 and 50b2 for AF, the edge of contrast can be detected with respect to not only the horizontal direction but also the vertical direction, and thereby, AF performance can be improved.

Further, as shown in FIG. 2C, the concave and convex forms may be formed so as to arrange the photoelectric conversion elements 50b2 for rear side AF in the concave portions 51 and the photoelectric conversion elements 50b1 for front side AF in the convex portions 53 diagonally in lines, respectively. In the normal contrast AF system, an AF evaluation value is obtained by integrating contrast components in a detection area with a part of the solid state image sensing device as the detection area. However, in FIGS. 2A and 2B, in the case where the edge of the contrast is in the horizontal direction and the vertical direction, since there is a possibility that the numbers of the photoelectric conversion elements 50b1 for front side AF and the photoelectric conversion elements 50b2 for rear side AF become different at the time of edge detection, the contrast by the photoelectric conversion elements 50b2 for rear side AF and the contrast by the photoelectric conversion elements 50b1 for front side AF sometimes become different. Accordingly, by arranging the photoelectric conversion elements 50b1 and 50b2 for AF as shown in FIG. 2C, edge detection in the horizontal and vertical directions can be reliably performed.

Further, the output difference (AF evaluation value difference) between the photoelectric conversion elements 50b2 for rear side AF and the photoelectric conversion elements 50b1 for front side AF may be stored in a memory or the like in advance. Thus, by storing the AF evaluation value difference in advance, the accuracy of the focusing position can be raised by correcting the AF evaluation value difference when calculating contrast.

Subsequently, a digital camera according to the embodiment of the invention, to which the above-described solid state image sensing device 50 is applied, will be described.

As shown in FIG. 4, on the top face of a digital camera 10 in which the above-described solid state image sensing device 50 is applied, a flash lamp 18 is provided that pops up from inside of the main body and emits light in cases where there is low brightness and suitable amount of light for exposure of the object can not be obtained. On the front face, a finder window 16 to which light representing an image substantially equal to the image of the object to be photographed and an optical unit 14 for forming the object image are provided. Further, on the side face of the digital camera 10, a slot 24 in which a recording medium 30 (see FIG. 5) of portable type for storing the image data obtained by photographing as digital data can be loaded. A USB terminal 42 for transmitting the image data obtained by photographing with the digital camera 10 to external equipment, and another terminal 44, are also provided. Further, an AC adapter connection port 28 for connecting an AC adapter for obtaining power from an alternating current power supply is also provided, and arranged so as to supply the alternating current power to the digital camera 10.

Figure 4B:
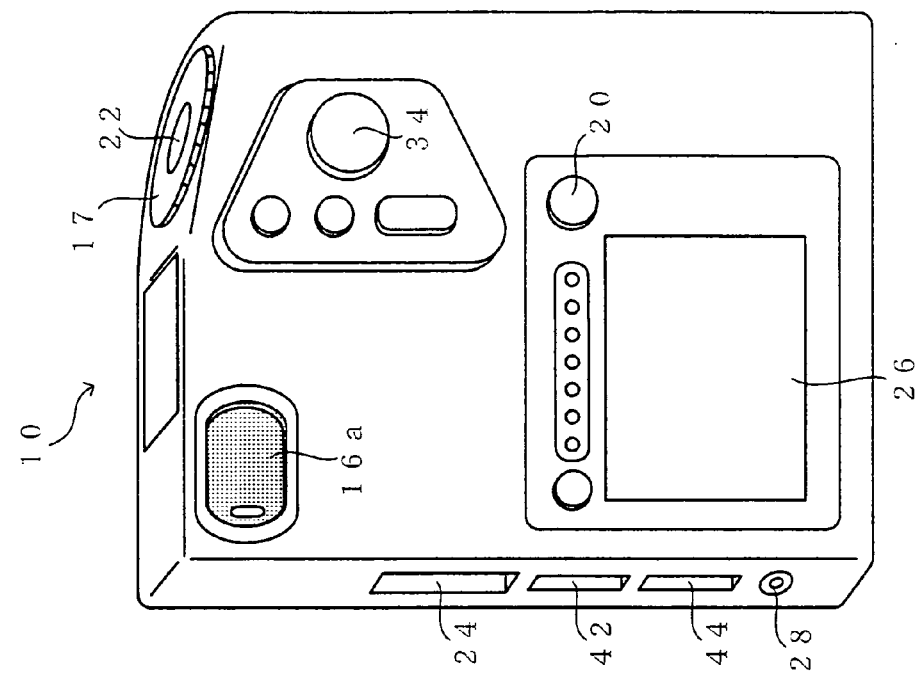
FIG. 4B is a perspective view showing the back of a digital camera according to the embodiment of the invention.
Figure 4A:
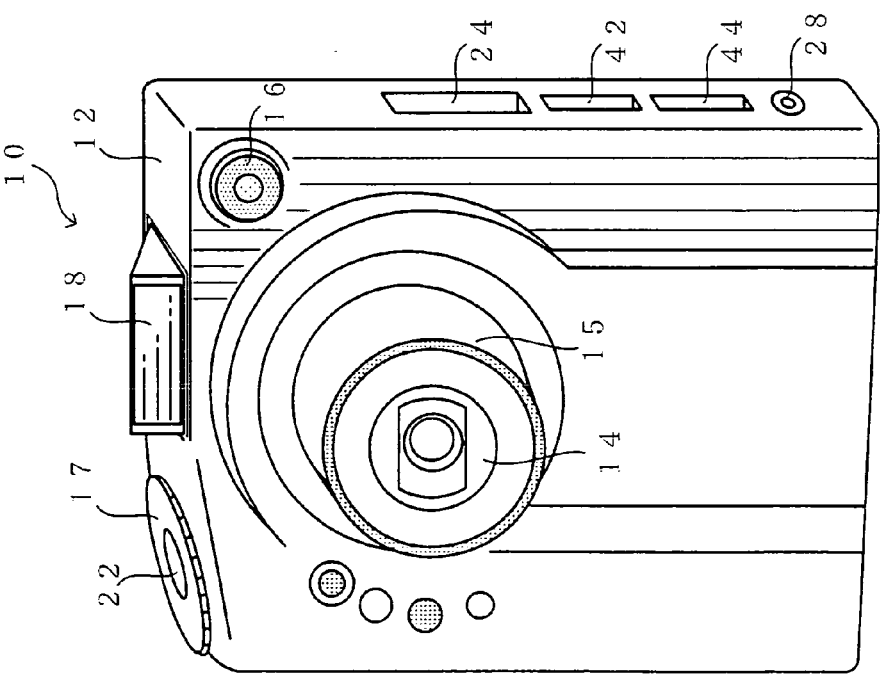
FIG. 4A is a perspective view showing the front of a digital camera according to the embodiment of the invention.

Note that, the optical unit 14 is a so-called telescopic type optical lens, and the unit is nested within a casing 12 of the main body of the digital camera 10 at the time other than shooting, while when shooting, a barrel 15 extendable and retractable in an optical axis direction is extended, and appears outside of the casing 12 as shown in FIG. 4A. Further, the optical unit 14 includes a shooting lens 36, a focusing lens 40 as an optical system of the invention, and an aperture mechanism 38 in the body tube 15 (see FIG. 5). The shooting lens 36 is constituted by one or more lenses.

Meanwhile, on the back face of the digital camera 10, as shown in FIG. 4B, a display unit (LCD) 26 for displaying the object image obtained by photographing, various menus, parameters and the like, is provided. A finder eyepiece 16a through which the light that enters from the finder window 16 is guided via an optical member and through which a photographer peers when the composition of the object image to be photographed is determined is also provided. An eight-direction key 34 operated by the photographer when scaling the shooting magnification up or down, or for selecting a desired menu item or parameter from the menu window displayed on the display unit 26 is also provided. Further, in the vicinity of the display unit 26, a power switch 20 for performing supply/stoppage of power supply to the respective parts of the digital camera 10 is provided.

Furthermore, on the top face of the digital camera 10, a shutter switch (a so-called release switch) 22 pressed by the photographer for inputting instructions for imaging and recording, and a mode dial 17 rotated by the photographer when selecting various modes such as photographing mode and edit mode, are provided.

Next, referring to FIG. 5, the constitution of the electrical system of the digital camera 10 according to the embodiment of the present invention will be described.

Figure 5:
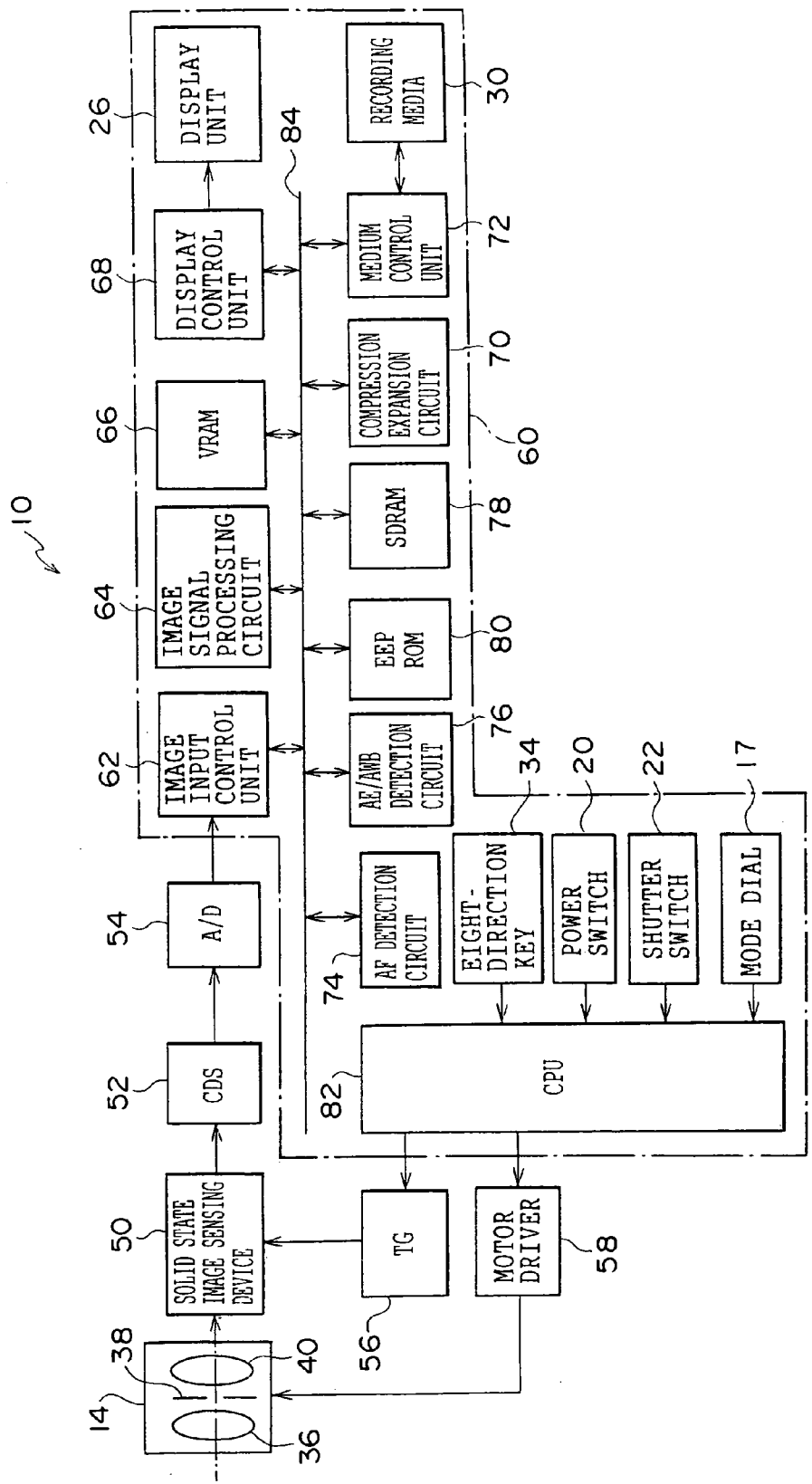
FIG. 5 is a block diagram showing the constitution of the electrical system of the digital camera according to the embodiment of the invention.

As shown in FIG. 5, the digital camera 10 includes the above described solid state image sensing device 50 disposed at the rear of the optical axis of the optical unit 14; a CDS circuit 52 for performing correlated double sampling processing (CDS) for eliminating noise components included in the output signal representing the object image that has been read out from the solid state image sensing device 50; a digital/analog converter (hereinafter, referred to as A/D converter) 54 for converting the analog signal processed by the CDS circuit 52 into the digital signal; a timing generator (TG) 56 for generating the timing signal for driving the solid state image sensing device 50; a zoom motor for moving the shooting lens 36 (extending and retracting the body tube) included in the optical unit 14; a motor driver 58 for driving the respective motors such as an AF motor for moving the focusing lens 40 and an iris motor for driving the aperture mechanism 38; and a main control unit 60 for controlling the entire operation of the digital camera 10. Note that the motor driver 58 corresponds to a moving component of the invention.

Further, in the main control unit 60, an image input control unit 62 for inputting the signal after digital conversion by the A/D converter 54 as image data representing the imaging result (object image) by the solid state image sensing device 50; an image signal processing circuit 64 for performing predetermined digital signal processing on the input image data; a VRAM 66 for storing the image data to be displayed on the display unit 26; a display control unit 68 for controlling the display unit 26 to display the image based on the image data stored in the VRAM 66; a compression/expansion circuit 70 for compressing and expanding the image data; a medium control unit 72 for reading various information from and writing it in the recording medium 30 loaded in the slot 24; an Auto Exposure (AE)/Auto White Balance (AWB) detection circuit 76 for detecting suitable exposure and white balance based on the imaging result by the solid state image sensing device 50; an AF detection circuit 74 for performing focal point adjustment by moving the focusing lens 40; a Synchronous Dynamic Random Access Memory (SDRAM) 78 used as a work memory; a Electrically Erasable Programmable Read Only Memory (EEPROM) 80 in which information such as various programs and parameters has been stored in advance; and a CPU 82 for suitably reading out the information from the EEPROM 80 to control the above described respective parts are all connected to each other by a bus 84. Further, the CPU 82 is connected to the TG 56 and the motor driver 58.

Furthermore, to the CPU 82, the eight-direction key 34, the power switch 20, the shutter switch 22, and the mode dial 17 provided in the digital camera 10 as operation components operated by the user are all connected. The CPU can thus constantly grasp operation information on these operation components operated by the photographer.

Specifically, in the case where the still image or moving image photographing mode is selected with the mode dial 17, the CPU 82 drives the TG 56 and allows the solid state image sensing device 50 to photograph the object image at predetermined timing.

Note that, generally, a shutter drain is provided at the solid state image sensing device 50 via a shutter gate, and a signal charge accumulated in the solid state image sensing device 50 can be swept out to the shutter drain by driving the shutter gate with a shutter gate pulse. That is, the solid state image sensing device 50 has a so-called electronic shutter mechanism for controlling the accumulation period of charge accumulated in the respective sensors (shutter speed) by the shutter gate pulse, however, a mechanical shutter may be provided in place of the electronic shutter.

The analog signal representing the object image output from the solid state image sensing device 50 is processed by the CDS circuit 52, and converted into the digital signal by the A/D converter 54, and then, input as image data into the main control unit 60 from the image input control unit 62. This input image data is once stored in the SDRAM 78 via the bus 84.

In the main control unit 60, focal point evaluation operation is performed in the AF detection circuit 74 and AE operation and AWB operation are performed in the AE/AWB detection circuit 76 based on the input image data. The CPU 82 controls the motor driver 58 and the solid state image sensing device 50 based on these operations to drive the drive components (for example, the AF motor, iris motor, or the like) of the focusing lens 40 and the aperture mechanism 38 and the electronic shutter function of the solid state image sensing device 50 so as to move the focusing lens 40 to the focusing point and set the aperture mechanism 38 and the electronic shutter function to the suitable exposure control values (f-number and shutter speed), and then, the AWB adjustment value is set. Further, the AE operation and AWB operation in the AE/AWB detection circuit 76 calculate brightness of the object (Ev value), an f-number and the like based on the image data, however, the invention is not limited to that. For example, a photo-sensor and the like for detecting ambient light may be provided and the values may be calculated based on the photo-sensor outputs.

Since the above described solid state image sensing device 50 is applied to the digital camera 10 according to the embodiment, the camera includes the photoelectric conversion elements 50$b$ for AF and the photoelectric conversion elements 50$a$ for imaging, and there is a possibility that detection values of contrast are different between the photoelectric conversion elements 50$b$1 for front side AF and the photoelectric conversion elements 50$b$2 for rear side AF. That is, since distances from the focusing lens 40 are different between the photoelectric conversion elements 50$b$1 for front side AF and the photoelectric conversion elements 50$b$2 for rear side AF, if the focusing position is set to the position where the detection values of contrast of the photoelectric conversion elements 50$b$1 for front side AF and the photoelectric conversion elements 50$b$2 for rear side AF become the same, the position becomes different from the real focusing point.

Accordingly, the AF detection circuit 74 determines the moving direction (focusing direction) of the focusing lens 40 based on the difference between the image data obtained from the photoelectric conversion elements 50$b$1 for front side AF and the image data obtained from the photoelectric conversion elements 50$b$2 for rear side AF, and controls the motor driver 58 to move the focusing lens 40 toward the determined focusing direction.

The AF detection circuit 74 is arranged so as to control the driving of the focusing lens 40 with the position where the contrast becomes the maximum as the focusing position based on the image data obtained from the photoelectric conversion element 50$a$ for imaging.

Further, in the case where the aperture detected by the AE/AWB detection circuit 76 is smaller (f-number is larger), because the focal depth is broader, there is no problem if the focusing lens 40 position where the output difference between the photoelectric conversion elements 50$b$1 for front side AF and the photoelectric conversion elements 50$b$2 for rear side AF becomes zero is set as the focusing point. Therefore, the AF detection circuit 74 is arranged so as to control the focusing point based only on the outputs of the photoelectric conversion elements 50$b$1 and 50$b$2 for AF when the aperture is within a predetermined range.

Figure 6A:
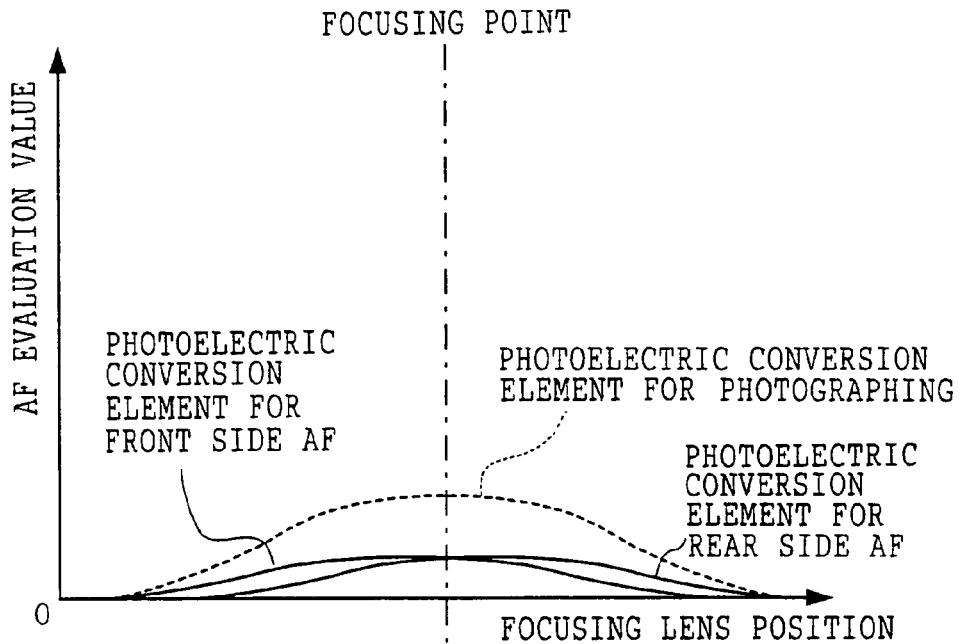
FIG. 6A is a graph illustrating a case where the output difference is unreliable because the outputs of the photoelectric conversion elements for front side AF and the photoelectric conversion elements for rear side AF are superposed.
Figure 6B:
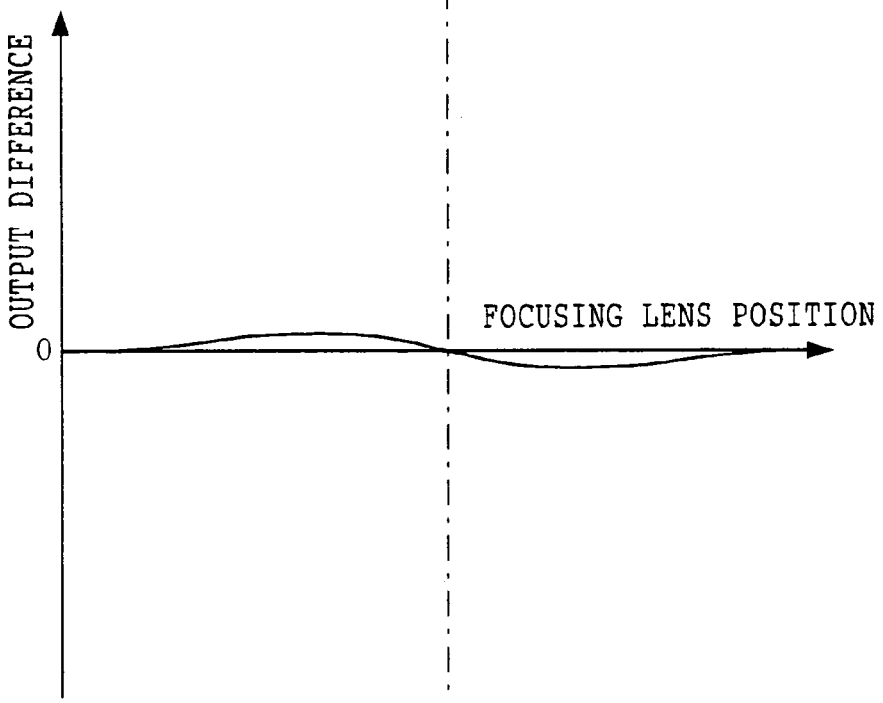
FIG. 6B is a graph showing the output difference between the photoelectric conversion elements for front side AF and the photoelectric conversion elements for rear side AF in the case where the output difference is unreliable because the outputs of the photoelectric conversion elements for front side AF and the photoelectric conversion elements for rear side AF are superposed.

Further, in the case where the aperture detected by the AE/AWB detection circuit 76 is even smaller, because the focal depth becomes much broader, there is a possibility that the outputs of the photoelectric conversion elements 50$b$1 for front side AF and the photoelectric conversion elements 50$b$2 for rear side AF are superposed, as shown in FIGS. 6A and 6B, and the output difference becomes no longer reliable. Accordingly, the AF detection circuit 74 controls so as to adjust the focusing point without using the outputs by the photoelectric conversion elements 50$b$1 and 50$b$2 for AF but using contrast of the photoelectric conversion elements 50$a$ for imaging.

Furthermore, the object brightness (Ev value) is detected by the AE/AWB detection circuit 76, and, if the object is in a dark condition, there is a possibility that the accurate contrast can not be obtained because the photoelectric conversion elements 50*b*1 and 50*b*2 for AF are smaller in size compared to the photoelectric conversion element 50*a* for imaging and lower in outputs. Accordingly, the AF detection circuit 74 controls so as to adjust the focusing point using contrast from the photoelectric conversion elements 50*a* for imaging. By the way, in the case where the IR filter is not provided to the photoelectric conversion elements 50*b*1 and 50*b*2 for AF, since their sensitivity is sometimes higher than the photoelectric conversion elements 50*a* for imaging in low brightness, in this case, the contrast from the photoelectric conversion elements 50*b*1 and 50*b*2 for AF may be used. Note that the AE/AWB detection circuit 76 corresponds to a light amount control component and a detection component of the invention.

Figure 7:
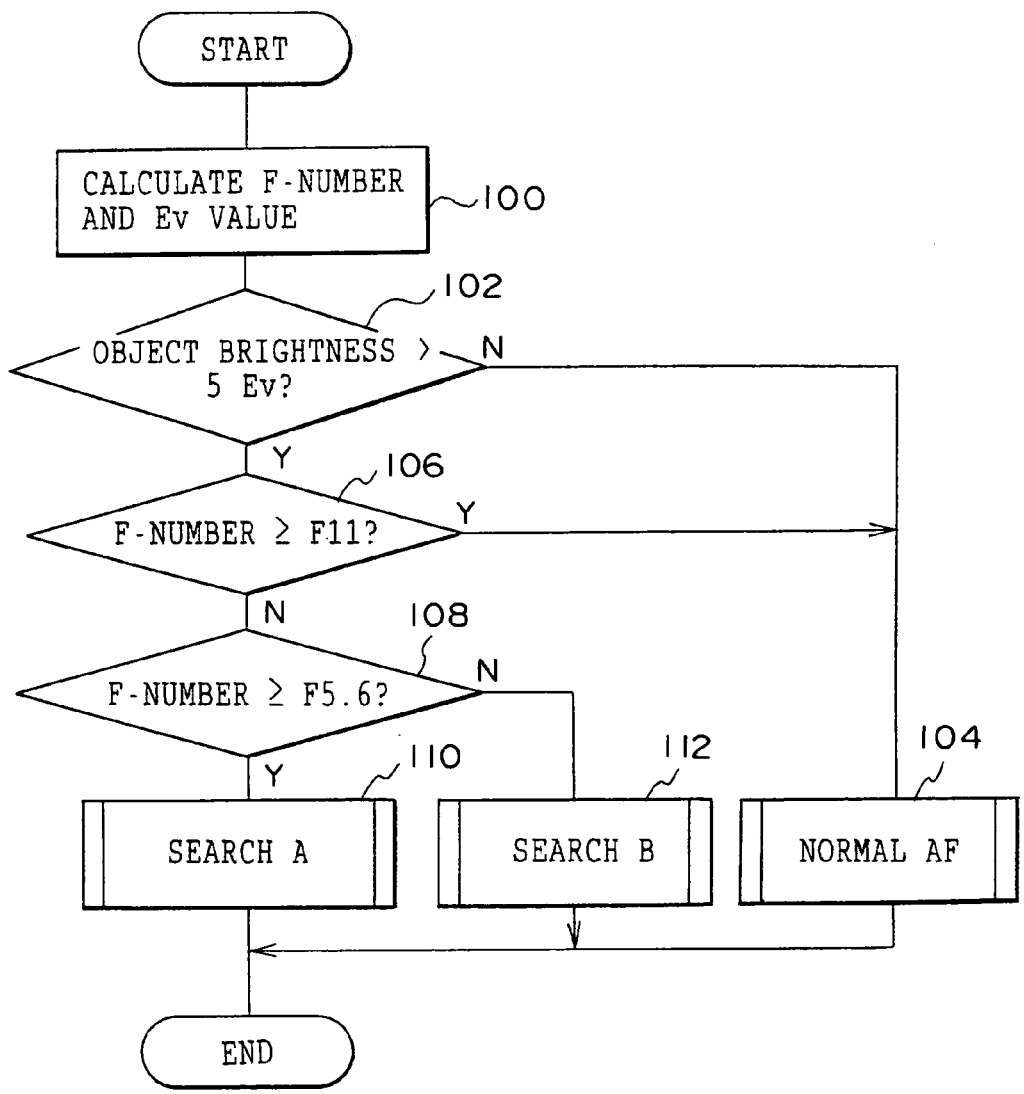
FIG. 7 is a flowchart showing an example of AF processing in the digital camera according to the embodiment of the invention.

Subsequently, the focal point adjustment control (hereinafter, referred to as AF control) in the digital camera 10 constituted as described above will be described by referring to a flowchart of FIG. 7.

First, in step 100, an f-number and an Ev value are calculated by the AE/AWB detection circuit 76. The image data obtained from the photoelectric conversion elements 50*b*1 and 50*b*2 for AF may be used, or the image data obtained from the photoelectric conversion elements 50*a* for imaging may be used for the calculation of the f-number and the Ev value.

Subsequently, in step 102, the CPU 82 judges whether the object brightness calculated by the AE/AWB detection circuit 76 is more than 5 Ev, and, in the case where the judgment result is negative, that is, the object is in a dark condition, shifting to step 104, normal AF processing is performed. This is because there is a possibility that the photoelectric conversion elements 50*b*1 and 50*b*2 for AF are smaller in size compared to the photoelectric conversion elements 50*a* for imaging and lower in outputs, and thereby, accurate contrast can not be obtained. The normal AF processing performs focusing control by detecting the focusing position while moving the focusing lens 40 so that the contrast value obtained from the photoelectric conversion element 50*a* for imaging may be the maximum.

Further, in the case where the judgment result in step 102 is positive, shifting to step 106, whether or not the f-number calculated by the AE/AWB detection circuit 76 is equal to or more than F11 is judged. If this judgment result is positive, that is, the f-number calculated by the AE/AWB detection circuit 76 is extremely small, because there is a possibility that the focal depth becomes very broad and the output difference between the photoelectric conversion elements 50*b*1 and 50*b*2 for AF becomes no longer reliable, shifting to step 104, the above described normal AF processing is performed.

If the judgment result in step 106 is negative, shifting to step 108, whether or not the f-number calculated by the AE/AWB detection circuit 76 is equal to or more than F5.6 is judged. When this judgment result is positive, shifting to step 110, processing of search A, which will be described later, is performed. When this judgment is negative, shifting to step 112, processing of search B, which will be described later, is performed.

That is, in search A in step 110, in the case where the aperture detected by the AE/AWB detection circuit 76 is smaller (f-number is larger), since there is no problem in setting the focusing lens 40 position where the output difference between the photoelectric conversion elements 50*b*1 for front side AF and the photoelectric conversion elements 50*b*2 for rear side AF becomes zero as the focusing point because of the broader focal point, focusing control is performed by using the photoelectric conversion elements 50*b*1 and 50*b*2 for AF only. On the other hand, in search B in step 112, the focusing direction is determined by using the photoelectric conversion elements 50*b*1 and 50*b*2 for AF, and the focusing position is determined finally by using the photoelectric conversion elements 50*a* for imaging. Thus, by determining the focusing direction using the photoelectric conversion elements 50*b*1 and 50*b*2 for AF, the time for detecting the focusing position by the photoelectric conversion elements 50*a* can be shortened, and thereby, AF processing can be performed at high speed.

Note that the steps 102, 106, and 108 correspond to a switching component of the invention, and the step 104 corresponds to a control component of the invention.

Figure 8:
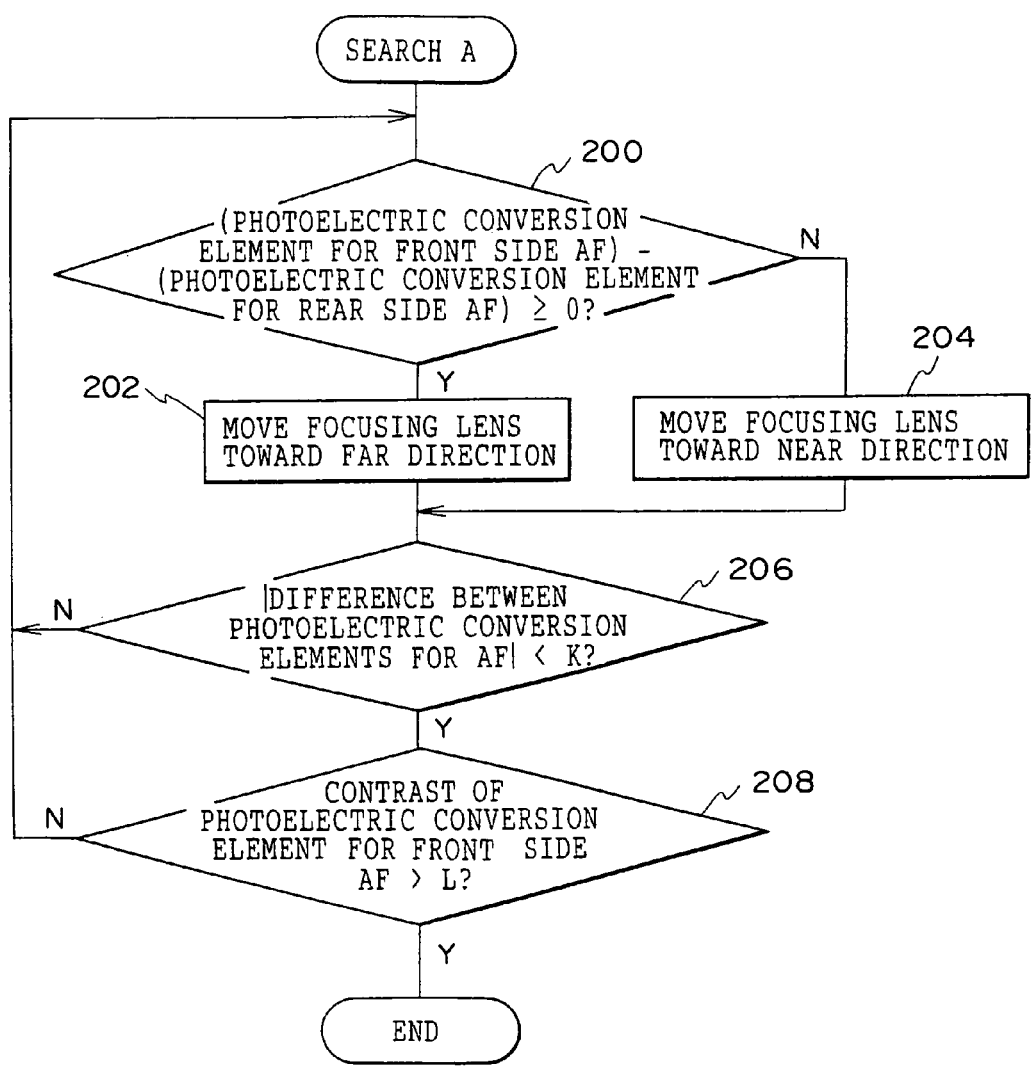
FIG. 8 is a flowchart showing a subroutine of search A.

Subsequently, the above mentioned search A will be described in detail by referring to a flowchart of FIG. 8.

In search A, first, in step 200, whether or not the output difference between the photoelectric conversion elements 50*b*1 for front side AF and the contrast of the photoelectric conversion elements 50*b*2 for rear side AF is equal to or more than zero is judged. That is, as shown in FIG. 3B, the focusing direction can be determined from the output difference between the photoelectric conversion elements 50*b*1 and 50*b*2 for AF.

If the judgment result in step 200 is positive, that is, the output of the photoelectric conversion elements 50*b*1 for front side AF is larger, shifting to step 202, the CPU 82 controls the motor driver 58 to move the focusing direction toward FAR direction and move the focusing lens 40. This is because the position of the focusing lens 40 is located in NEAR direction relative to the focusing point.

Further, if the judgment result in step 200 is negative, that is, the output of the photoelectric conversion elements 50*b*1 for front side AF is smaller, shifting to step 204, the CPU 82 controls the motor driver 58 to move the focusing direction toward NEAR direction and move the focusing lens 40. This is because the position of the focusing lens 40 is located in FAR direction relative to the focusing point. Note that the steps 200 to 204 correspond to a focusing direction control component of the invention.

Subsequently, in step 206, whether or not the absolute value of the output difference between the photoelectric conversion elements 50*b*1 and 50*b*2 for AF is less than a predetermine value K is judged, and, if the judgment result is negative, returning to step 200, above described processing is repeated until the judgment result in step 206 becomes positive. When the judgment result in step 206 is positive, the processing is shifted to step 208.

In step 208, whether or not the contrast value of the photoelectric conversion elements 50*b*1 for front side AF is larger than the predetermined value L is judged. If the judgment result is negative, returning to the above described step 200, above described processing is repeated until the judgment result in step 208 becomes positive, and when the judgment result is positive, the series of AF control is completed. That is, since there are three points where the difference between the photoelectric conversion elements 50*b*1 and 50*b*2 for AF becomes about zero including the focusing point, such judgment is performed in order to confirm that the point is in the vicinity of the focusing point. Since the contrast value of some degree is exhibited in the output of the photoelectric conversion elements 50*b*1 for front side AF in the vicinity of the focusing point, the predetermined value L is determined in advance based thereon. By the way, for the judgment in step 208, not the output of the photoelectric conversion elements 50*b*1 for front side AF but the output of the photoelectric conversion elements 50b2 for rear side AF may be used.

Thus, in search A, the focusing direction is determined by using the photoelectric conversion elements 50b1 and 50b2 for AF only and the focusing point can be detected, and thereby, AF processing can be performed at high speed.

Figure 9:
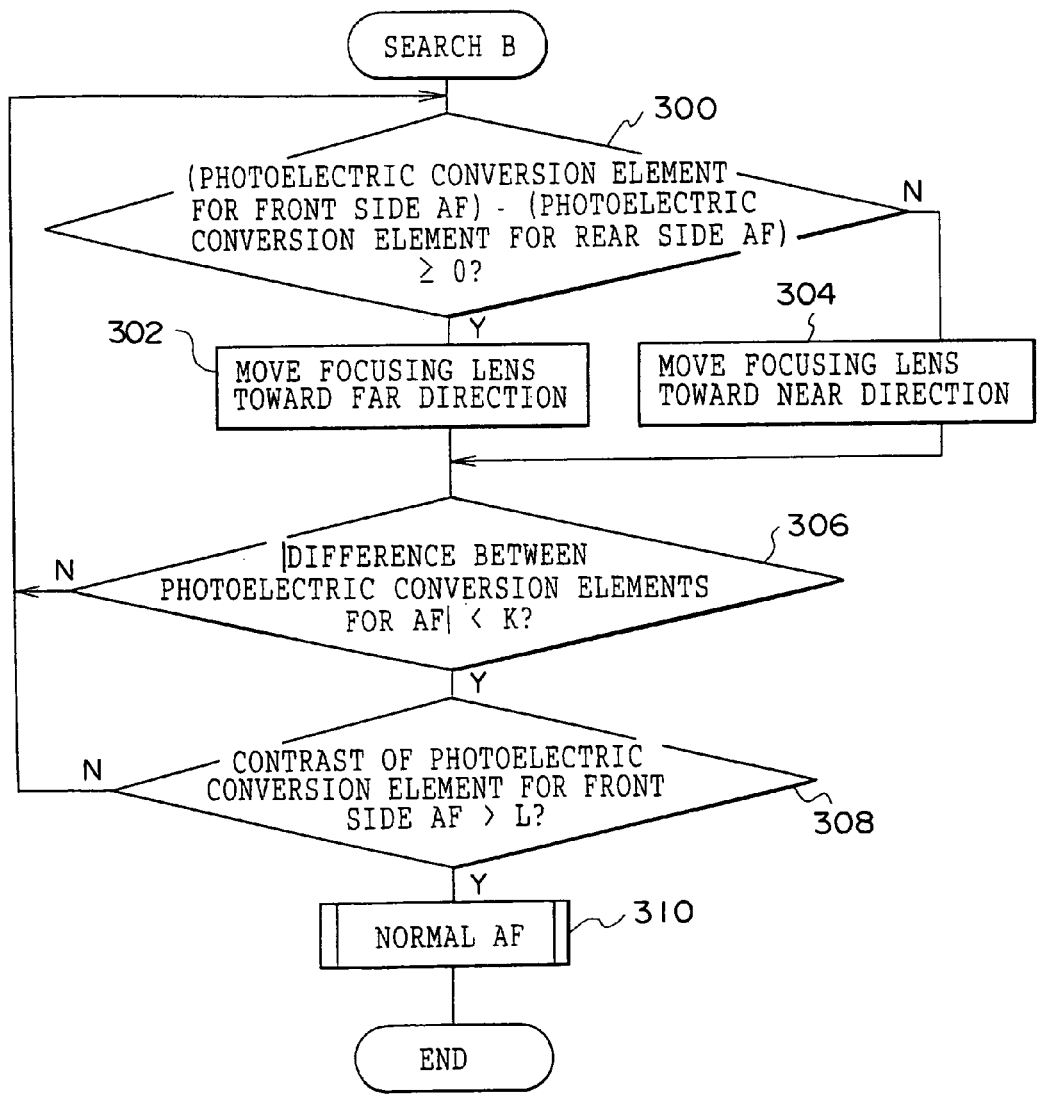
FIG. 9 is a flowchart showing a subroutine of search B.

Next, the above mentioned search B will be described in detail by referring to the flowchart of FIG. 9.

In search B, first, as well as search A, in step 300, whether or not the output difference between the photoelectric conversion elements 50b1 for front side AF and the contrast of the photoelectric conversion elements 50b2 for rear side AF is equal to or more than zero is judged. That is, as shown in FIG. 3B, the focusing direction can be determined from the output difference between the photoelectric conversion elements 50b1 and 50b2 for AF.

If the judgment result in step 300 is positive, that is, the output of the photoelectric conversion elements 50b1 for front side AF is larger, shifting to step 302, the CPU 82 controls the motor driver 58 to move the focusing direction toward FAR direction and move the focusing lens 40. This is because the position of the focusing lens 40 is located in NEAR direction relative to the focusing point.

Further, if the judgment result in step 300 is negative, that is, the output of the photoelectric conversion elements 50b1 for front side AF is smaller, shifting to step 304, the CPU 82 controls the motor driver 58 to move the focusing direction toward NEAR direction and move the focusing lens 40. This is because the position of the focusing lens 40 is located in FAR direction relative to the focusing point. Note that the steps 300 to 304 correspond to the focusing direction control component of the invention.

Subsequently, in step 306, whether or not the absolute value of the difference between the photoelectric conversion elements 50b1 and 50b2 for AF is less than the predetermine value K is judged, and, if the judgment result is negative, returning to step 300, above described processing is repeated, and when the judgment result in step 306 is positive, the processing is shifted to step 308.

In step 308, whether or not the absolute value of the contrast of the photoelectric conversion elements 50b1 is larger than the predetermined value L is judged, and the above described processing is repeated until the judgment result becomes positive, and shifted to step 310 when the judgment result is positive. That is, since there are three points where the output difference between the photoelectric conversion elements 50b1 and 50b2 for AF becomes about zero including the focal point, such judgment is performed in order to confirm that the point is in the vicinity of the focusing point. Since the contrast value of some degree is exhibited in the output of the photoelectric conversion elements 50b1 for front side AF in the vicinity of the focusing point, the predetermined value L is determined in advance based thereon. By the way, for the judgment in step 308, not the output of the photoelectric conversion elements 50b1 for front side AF but the output of the photoelectric conversion elements 50b2 for rear side AF may be used.

In step 310, the above described normal AF processing is performed. That is, the focusing lens 40 is moved so that the contrast value obtained from the photoelectric conversion elements 50a for imaging may be the maximum, and thereby, the focal point adjustment of the focusing lens 40 is performed and the series of AF control is completed.

Thus, in search B, since the focusing direction is determined by using the photoelectric conversion elements 50b1 and 50b2 for AF, and the accurate focusing point is determined by using the photoelectric conversion elements 50a for imaging, the time for detecting the focusing position can be shortened, and the AF processing can be performed at high speed.

That is, in the embodiment, the moving direction of the focus lens 40 is determined from the difference between the contrast values of the photoelectric conversion elements 50b1 and 50b2 for AF, and the focusing lens 40 is moved so that the contrast value of the photoelectric conversion elements 50a for imaging may be the maximum, and thereby, focal point adjustment can be easily performed without using a special optical system. Since the moving direction of the focus lens 40 can be determined by the difference between the contrast values of the photoelectric conversion elements 50b1 and 50b2 for AF only, AF processing can be performed at high speed.

Furthermore, by switching the searching method of the focusing point according to the object brightness and the aperture, AF processing can be performed with accuracy at high speed.

Figure 10:
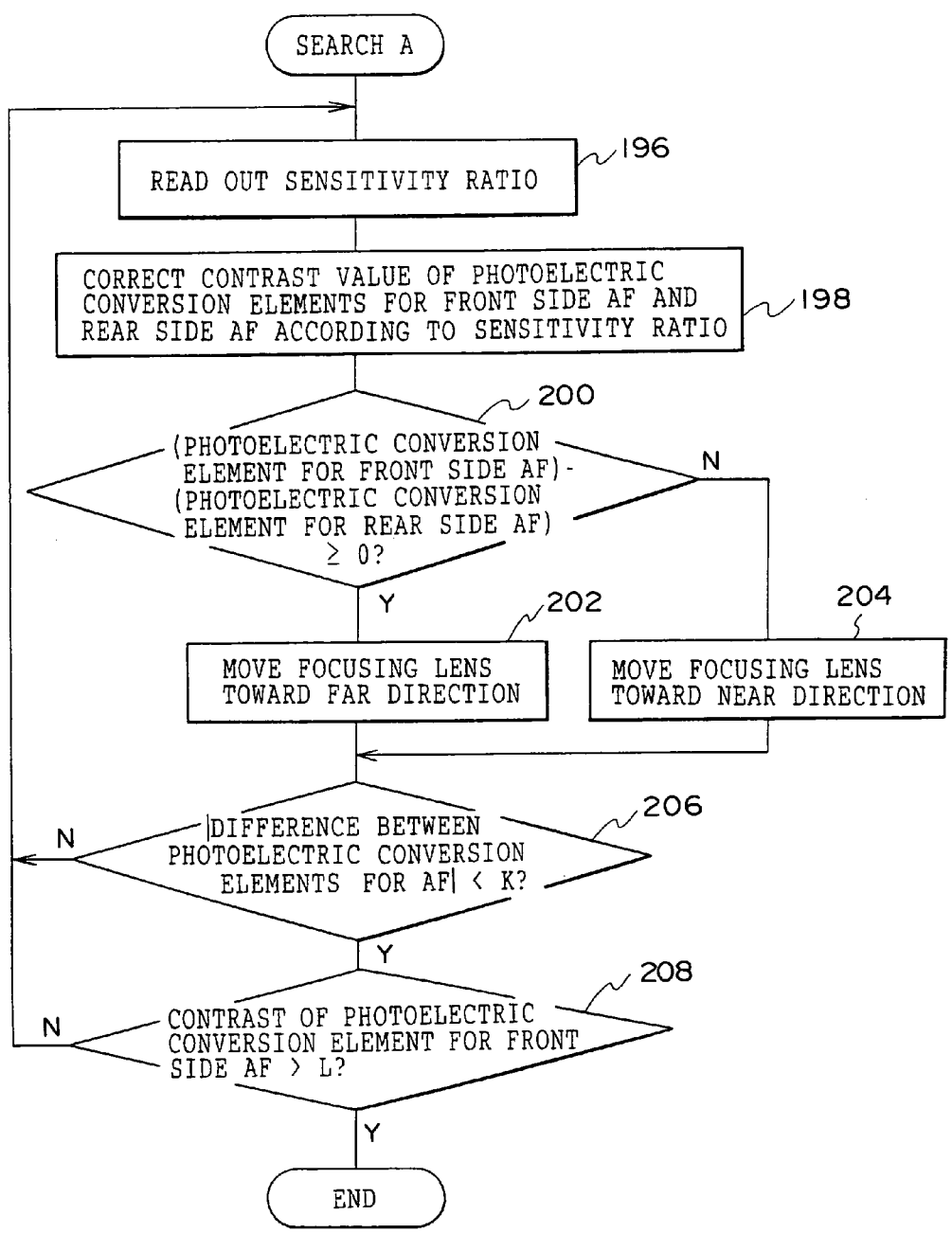
FIG. 10 is a flowchart showing a modified example of search A.

Note that the search A may store the sensitivity ratio between the photoelectric conversion elements 50b1 for front side AF and the photoelectric conversion elements 50b2 for rear side AF in advance in a memory as a storage component such as the EEPROM 80 and DRAM 78, and show it in a flowchart of FIG. 10. In FIG. 10, the same processing as those in FIG. 8 are shown by assigning the same numerals.

That is, in step 196, the sensitivity ratio that has been stored in advance is read out, shifting to step 198, the contrast values of the photoelectric conversion elements 50b1 for front side AF to the photoelectric conversion elements 50b2 for rear side AF are corrected according to the sensitivity ratio. The steps 196 and 198 correspond to a correction component of the invention.

Then, in step 200, whether or not the output difference between the photoelectric conversion elements 50b1 for front side AF and the contrast of the photoelectric conversion elements 50b2 for rear side AF is equal to or more than zero is judged. That is, as shown in FIG. 3B, the focusing direction can be determined from the output difference between the photoelectric conversion elements 50b1 and 50b2 for AF.

If the judgment result in step 200 is positive, that is, the output of the photoelectric conversion elements 50b1 for front side AF is larger, shifting to step 202, the CPU 82 controls the motor driver 58 to move the focusing direction toward FAR direction and move the focusing lens 40. This is because the position of the focusing lens 40 is located in NEAR direction relative to the focusing point.

Further, if the judgment result in step 200 is negative, that is, the output of the photoelectric conversion elements 50b1 for front side AF is smaller, shifting to step 304, the CPU 82 controls the motor driver 58 to move the focusing direction toward NEAR direction and move the focusing lens 40. This is because the position of the focusing lens 40 is located in FAR direction relative to the focusing point.

Subsequently, in step 206, whether or not the absolute value of the difference between the photoelectric conversion elements 50b1 and 50b2 for AF is less than the predetermine value K is judged, and, if the judgment result is negative, returning to step 200, above described processing is repeated until the judgment result in step 206 becomes positive. When the judgment result in step 206 is positive, the processing is shifted to step 208.

In step 208, whether or not the contrast value of the photoelectric conversion elements 50b1 is larger than the predetermined value L is judged. If the judgment result is negative, returning to the above described step 196, the above described processing is repeated until the judgment result in step 208 becomes positive. When the judgment result is positive, the series of AF control is completed. That is, since there are three points where the difference between the photoelectric conversion elements 50$b$1 and 50$b$2 for AF becomes about zero including the focusing point, such judgment is performed in order to confirm that the point is in the vicinity of the focusing point. Since the contrast value of some degree is exhibited in the output of the photoelectric conversion elements 50$b$1 for front side AF in the vicinity of the focusing point, the predetermined value L is determined in advance based thereon. By the way, for the judgment in step 208, not the output of the photoelectric conversion elements 50$b$1 for front side AF but the output of the photoelectric conversion elements 50$b$2 for rear side AF may be used.

Thus, by having stored the sensitivity ratio between the photoelectric conversion elements 50$b$1 and 50$b$2 for AF and correcting the respective contrast values according to the sensitivity ratio, and thereby, the focusing point can be ensured to be detected by the difference between the contrast values of the photoelectric conversion elements 50$b$1 and 50$b$2 for AF, and focusing accuracy can be improved.

In this case, since the focusing accuracy can be improved, the processing of the flowchart of FIG. 10 can be performed not only in search A but also in search B, and by thus processing the search A and search B, focal point adjustment can be performed by the photoelectric conversion elements 50$b$1 and 50$b$2 for AF only.

Figure 11A:
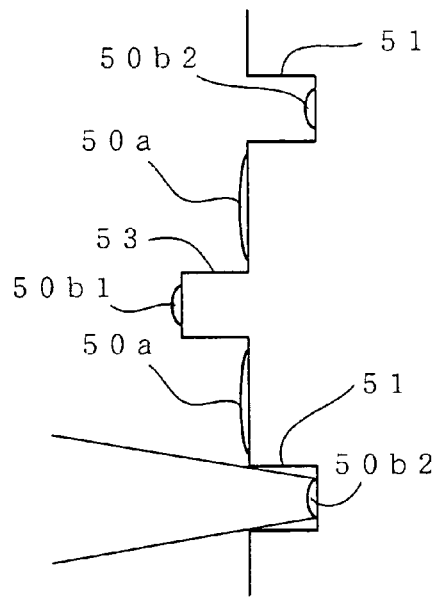
FIGS. 11A to 11C are diagrams showing modified examples of the solid state image sensing device of the invention.
Figure 11B:
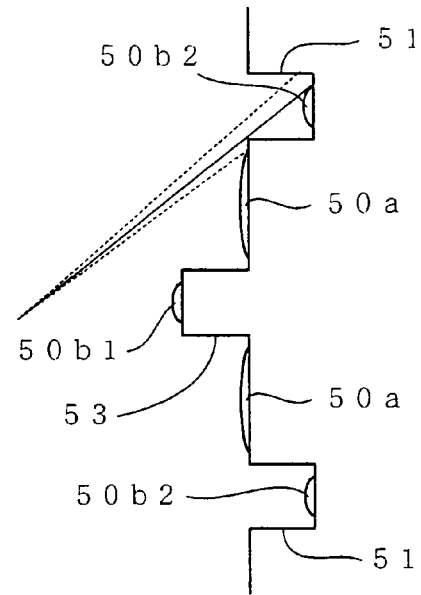
Figure 11C:
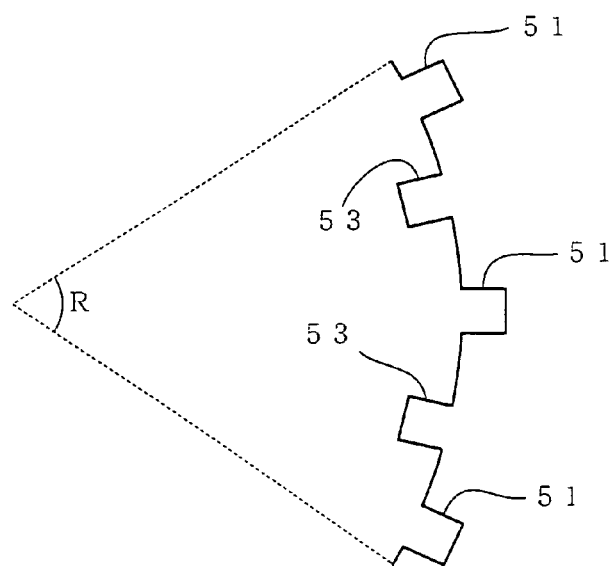

In the concave portions 51 on the central part of the solid state image sensing device 50 according to the embodiment, light enters via various lenses including the focusing lens 40 or the like as shown in FIG. 11A, however, in the outside vicinity of the solid state image sensing device 50, it is conceivable that the light does not enter the concave portions 51 in the vicinity outside of the solid state image sensing device 50 depending on the incident angle of the light as shown in FIG. 11B. Accordingly, as shown in FIG. 11C, the solid state image sensing device 50 may be made in the form having curvature of R according to the lens curvature and the like. Thereby, the light can be ensured to enter the concave portions 51 in the vicinity outside of the solid state image sensing device 50.

What is claimed is:

1. A solid state image sensing device comprising:
   plural photoelectric conversion elements for photographing an object;
   concave portions provided on a surface on which the photoelectric conversion elements for photographing are arranged;
   convex portions provided on the surface on which the photoelectric conversion elements for photographing are arranged; and
   auxiliary photoelectric conversion elements provided in the concave portions and the convex portions.

2. The solid state image sensing device of claim 1, wherein color filters are provided on the photoelectric conversion elements for photographing other than the auxiliary photoelectric conversion elements.

3. The solid state image sensing device of claim 2, wherein white filters are provided on the auxiliary photoelectric conversion elements.

4. The solid state image sensing device of claim 1, wherein infrared filters are provided on the photoelectric conversion elements for photographing other than the auxiliary photoelectric conversion elements.

5. The solid state image sensing device of claim 1, wherein the surface on which the photoelectric conversion elements for photographing and the auxiliary photoelectric conversion elements are arranged is a curved surface.

6. The solid state image sensing device of claim 5, wherein the curved surface is curved in accordance with the curvature of a lens that forms an image on the solid state image sensing device.

7. The solid state image sensing device of claim 1, wherein the distances between the photoelectric conversion elements for photographing and the auxiliary photoelectric conversion elements provided in the concave portions and the distances between the photoelectric conversion elements for photographing and the auxiliary photoelectric conversion elements provided in the convex portions are equal.

8. A photographing apparatus comprising:
   a solid state image sensing device including
   a plurality of photoelectric conversion elements for photographing that photographs an object;
   concave portions provided on a surface on which the photoelectric conversion elements for photographing are arranged;
   convex portions provided on the surface on which the photoelectric conversion elements for photographing are arranged; and
   auxiliary photoelectric conversion elements provided in the concave portions and the convex portions;
   an optical system that forms an image of an object on the solid state image sensing device;
   a moving component that moves the optical system for focal point adjustment;
   a focusing direction control component that determines a focusing direction based on the difference between outputs of the auxiliary photoelectric conversion elements provided in the concave portions and outputs of the auxiliary photoelectric conversion elements provided in the convex portions, and controls the moving component to move the optical system in the determined focusing direction; and
   a control component that sets the maximum value of the contrast value in the outputs of the photoelectric conversion elements for photographing as a focusing position, and controls the moving component to move the optical system to the focusing position.

9. The photographing apparatus of claim 8, further comprising:
   a light amount control component that controls the amount of light that enters into the solid state image sensing device; and
   a switching component that switches for switching with or without the control of the focusing direction control component in accordance with the control of the light amount control component.

10. The photographing apparatus of claim 8, further comprising:
    a detection component that detects the brightness of the object; and
    a switching component that switches with or without the control of the focusing direction control component in accordance with the brightness detected by the detection component.

11. The photographing apparatus of claim 8, further comprising:
    a storage component that stores, in advance, the sensitivity ratio between the auxiliary photoelectric conversion elements provided in the concave portions and the auxiliary photoelectric conversion elements provided in the convex portions; and a correction component that corrects the output values of the auxiliary photoelectric conversion elements based on the sensitivity ratio stored in the storage component.

12. The photographing apparatus of claim 8, wherein color filters are provided on the photoelectric conversion elements for photographing other than the auxiliary photoelectric conversion elements.

13. The photographing apparatus of claim 8, wherein infrared filters are provided on the photoelectric conversion elements for photographing other than the auxiliary photoelectric conversion elements.

14. The photographing apparatus of claim 8, wherein the surface on which the photoelectric conversion elements for photographing and the auxiliary photoelectric conversion elements are arranged is a curved surface.

15. A focusing method using a photographing apparatus comprising:

providing a solid state image sensing device that includes at least plural photoelectric conversion elements for photographing that photographs an object;

concave portions provided on a surface on which the photoelectric conversion elements for photographing are arranged;

convex portions provided on the surface on which the photoelectric conversion elements for photographing are arranged; and auxiliary photoelectric conversion elements provided in the concave portions and the convex portions;

determining a focusing direction based on the difference between outputs of the auxiliary photoelectric conversion elements provided in the concave portions and outputs of the auxiliary photoelectric conversion elements provided in the convex portions;

moving an optical system in the determined focusing direction;

determining a focusing position having the maximum contrast value in the outputs of the photoelectric conversion elements for photographing; and moving the optical system to the focusing position.

* * * * *